(12) United States Patent
Van Tilburg et al.

(10) Patent No.: US 10,492,459 B2
(45) Date of Patent: Dec. 3, 2019

(54) MILKING SYSTEM

(71) Applicant: LELY PATENT N.V., Maassluis (NL)

(72) Inventors: Ruben Alexander Van Tilburg, Maassluis (NL); Dirk Dijkshoorn, Maassluis (NL); Mattheus Jacob De Hullu, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 358 days.

(21) Appl. No.: 15/128,241

(22) PCT Filed: Apr. 28, 2015

(86) PCT No.: PCT/NL2015/050282
§ 371 (c)(1),
(2) Date: Sep. 22, 2016

(87) PCT Pub. No.: WO2015/170970
PCT Pub. Date: Nov. 12, 2015

(65) Prior Publication Data
US 2017/0099801 A1 Apr. 13, 2017

(30) Foreign Application Priority Data
May 9, 2014 (NL) ...................................... 2012793

(51) Int. Cl.
*A01J 5/00* (2006.01)
*A01J 5/007* (2006.01)
(Continued)

(52) U.S. Cl.
CPC ............... *A01J 5/007* (2013.01); *A01J 5/044* (2013.01); *A01J 7/022* (2013.01); *A01J 7/027* (2013.01); *A01J 9/00* (2013.01); *A01J 9/06* (2013.01)

(58) Field of Classification Search
CPC .. A01J 5/007; A01J 5/044; A01J 7/022; A01J 7/027; A01J 9/00; A01J 9/06
See application file for complete search history.

(56) References Cited

U.S. PATENT DOCUMENTS 5,080,040 A * 1/1992 van der Lely .......... A01J 5/007
                                                   119/14.09
5,275,124 A * 1/1994 van der Lely .......... A01J 5/007
                                                   119/14.08
(Continued)

FOREIGN PATENT DOCUMENTS

| CN | 202406727 U | 9/2012 |
| GB | 2 303 226 A | 2/1997 |
| WO | WO 2010/036102 A2 | 4/2010 |

*Primary Examiner* — Michael H Wang
(74) *Attorney, Agent, or Firm* — Birch, Stewart, Kolasch & Birch, LLP

(57) ABSTRACT

A milking system includes a milking device, and a milk storage system having: a temporary milk storage vessel for temporarily storing milk from a plurality of milking operations, a milk pipe from the milking device to the temporary milk storage vessel, a milk tank for storing the milk from the temporary milk storage vessel, a control unit, a main milk pipe from the temporary milk storage vessel to the milk tank, a pressurized liquid supply which is controllable by the control unit and is provided and configured to supply a pressurized liquid, other than milk, to the milk storage system, a first and a second discharge provided on the main milk pipe, a selection device which is controllable by the control unit and is on the main milk pipe towards the first discharge or the second discharge, wherein the control unit is configured to perform a milk transferring action for transferring milk in the main milk pipe into the milk tank with the aid of the pressurized liquid, wherein the liquid transferring action includes bringing the pressurized liquid supply and the first discharge into liquid connection with the (Continued)

Figure 2A:
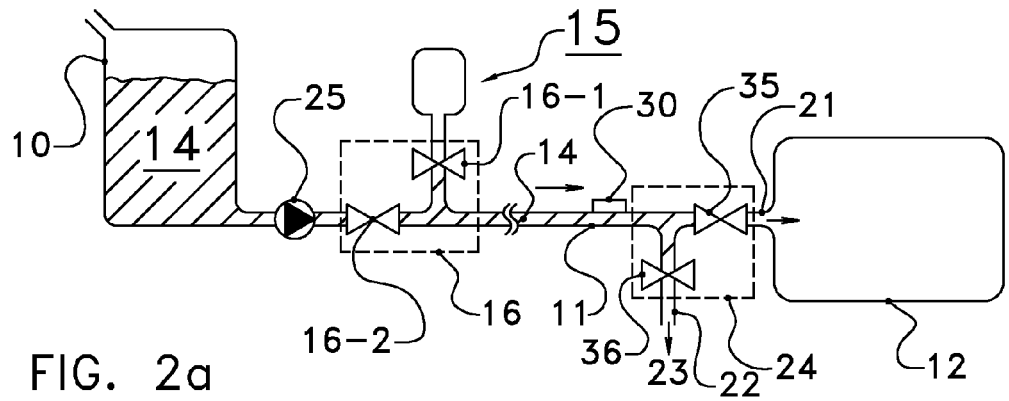

main milk pipe, and breaking a liquid connection of the main milk pipe with the second discharge, allowing an amount of pressurized liquid to flow under pressure from the pressurized liquid supply into the main milk pipe, and breaking the liquid connection between the main milk pipe and the first discharge. Transferring the milk in this way means that it is subjected to less mechanical load and mixed with less air, which benefits the quality. The invention also provides a temporary milk storage vessel and method of this type.

22 Claims, 2 Drawing Sheets

(51) Int. Cl.
*A01J 5/04* (2006.01)
*A01J 7/02* (2006.01)
*A01J 9/00* (2006.01)
*A01J 9/06* (2006.01)

(56) References Cited

U.S. PATENT DOCUMENTS

| | | | |
|---|---|---|---|
| 5,651,329 A | 7/1997 | van den Berg et al. | |
| 5,762,020 A | 6/1998 | van der Lely | |
| 6,079,359 A * | 6/2000 | van den Berg | A01J 5/0175 |
| | | | 119/14.01 |
| 6,089,242 A * | 7/2000 | Buck | A01J 7/022 |
| | | | 119/14.18 |
| 6,443,093 B1 * | 9/2002 | van der Lely | A01K 9/00 |
| | | | 119/14.01 |
| 7,143,718 B2 * | 12/2006 | Bosma | A01J 5/0175 |
| | | | 119/14.02 |
| 7,757,634 B2 * | 7/2010 | Croft | A01J 7/00 |
| | | | 119/14.01 |
| 2004/0244697 A1 | 12/2004 | Bosma et al. | |
| 2011/0168097 A1 * | 7/2011 | Kristensen | A01J 7/022 |
| | | | 119/14.03 |
| 2016/0135424 A1 * | 5/2016 | Bosma | A01K 1/12 |
| | | | 119/14.02 |

* cited by examiner

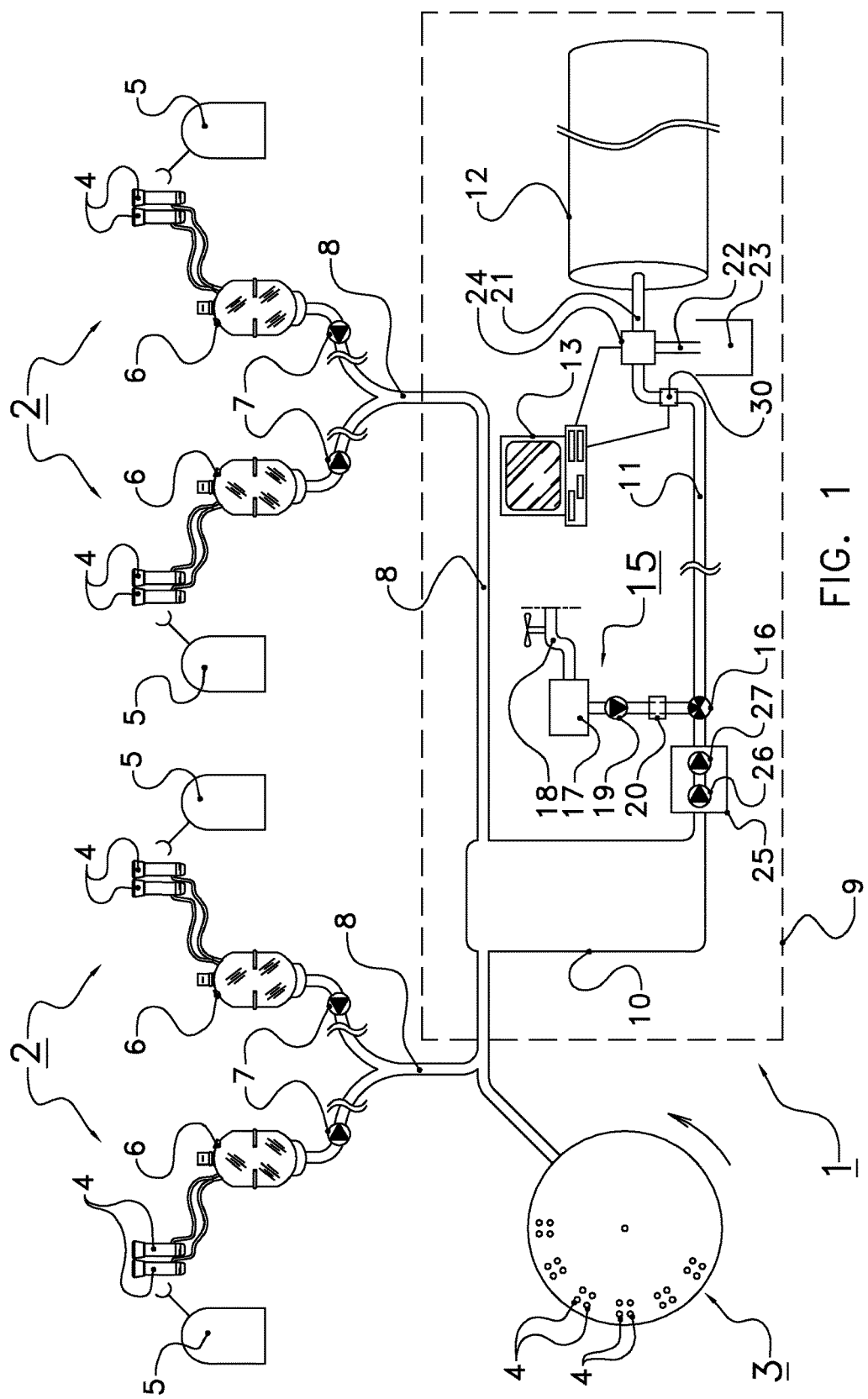

MILKING SYSTEM

The present invention relates to a milking system, comprising at least one milking device, and a milk storage system, wherein the milk storage system comprises a temporary milk storage vessel configured to temporarily store milk from a plurality of milking operations of the at least one milking device, at least one milk pipe connected to the temporary milk storage vessel for supplying milk from the one or more milking devices to the temporary milk storage vessel, a milk tank for storing the milk from the temporary milk storage vessel, a control unit for controlling the milk storage system, and a main milk pipe from the temporary milk storage vessel to the milk tank, wherein the milk storage system is configured to transfer the milk from the temporary milk storage vessel to the milk tank via the main milk pipe.

Milking systems of this type are known per se, and comprise at least one, and preferably a plurality of, milking devices and a system for storing milk until it is collected by a milk tanker. The milk storage system comprises a temporary milk storage vessel, or buffer vessel, which is connected to at least one, and preferably a plurality of, milking devices by at least one milk pipe, or a milk pipe system. A main milk pipe is also provided between the temporary milk storage vessel and the milk tank. It is also possible to provide a plurality of temporary milk storage vessels and a plurality of milk tanks. It is also expressly noted that the temporary milk storage vessel cannot be equated with an optionally provided milk jar in a milking device, which solely serves to contain the milk from one milking operation before it is pumped to the temporary milk storage vessel. This difference is particularly apparent in the sizes of the respective milk vessels: a milk jar can hold, for example, approximately 30 liters, a temporary milk storage vessel will be able to hold at least 100 liters, and usually several hundred liters, whereas a milk tank usually has a volume of several thousand liters and will also be provided with a milk-cooling system.

A problem with the known milking devices is that transferring milk through the system, in particular from the temporary milk storage vessel to the milk tank, can have a detrimental effect on the milk quality. This may be apparent, in particular, in an increased free fatty acid content. This is undesirable in the case of drinking milk.

It is an object of the present invention to at least partly solve said problem, in particular by improving a milking system of the specified type in such a way that there is a better retention of the milk quality during the transport of milk.

The invention achieves this object by means of a milking system as claimed in claim 1, in particular a milking system comprising at least one milking device, and a milk storage system, wherein the milk storage system comprises a temporary milk storage vessel configured to temporarily store milk from the at least one milking device, at least one milk pipe connected to the temporary milk storage vessel for supplying milk from the one or more milking devices to the temporary milk storage vessel, a milk tank for storing the milk from the temporary milk storage vessel, a control unit for controlling the milk storage system, a main milk pipe from the temporary milk storage vessel to the milk tank, wherein the milk storage system is configured to transfer the milk from the temporary milk storage vessel to the milk tank via the main milk pipe, and further comprises a pressurized liquid supply which is controllable by the control unit and is provided and configured to supply a pressurized liquid, other than milk, under pressure to at least one of the temporary milk storage vessel and the main milk pipe, a first discharge to the milk tank and a second discharge to a destination other than the milk tank, provided on the main milk pipe, a selection device which is controllable by the control unit and is on the main milk pipe, which first selection device is configured to selectively bring either the first discharge or the second discharge into liquid connection with the main milk pipe, wherein the control unit is configured to perform a milk transferring action for transferring milk in the main milk pipe into the milk tank with the aid of the pressurized liquid, wherein the liquid transferring action comprises the steps of bringing the pressurized liquid supply and the first discharge into liquid connection with the main milk pipe, and breaking a liquid connection of the main milk pipe with the second discharge, allowing an amount of pressurized liquid to flow from the pressurized liquid supply into the main milk pipe, and breaking the liquid connection between the main milk pipe and the first discharge.

The idea behind the present invention is that milk is pumped in such a way that it is subjected to as little mechanical load as possible. In the known milking systems, milk is usually pumped with the aid of compressed air. Compressed air is not readily manageable as a medium, and can lead to high speeds in the milk and the mixing of the milk with air. Both of these phenomena are less desirable and are counteracted by the present invention by pumping the milk or pushing it through the main milk pipe using liquid. As liquid is non-compressible, this increases the control over the pumping in comparison with compressed air. Moreover, mixing with air will not be possible. This will lead to fewer fatty acids being created during the pumping, from damaged fat globules or the like.

In the present invention, the first discharge will be the main discharge from the main milk pipe to the milk tank, in order to transfer milk into the milk tank. This will relate, in particular, to drinking milk for human consumption as this is subject to the highest quality requirements. For milk which is to be rejected, such as antibiotic milk, mastitis milk, etc., such quality requirements do not apply, or apply to a far lesser extent. This milk can also be transferred using, for example or preferably, compressed air, with higher pump speeds being permitted.

The second discharge may be located near the first shut-off device or even combined therewith, but may also be in a different location. The selection device could therefore comprise a plurality of valves in a plurality of housings, which will be explained in more detail below.

It will also be clear that the control unit is configured to operate the selection device in such a way that the functions mentioned will be performed. It should be noted that the latter function, namely breaking the liquid connection between the main milk pipe and the first discharge, will be relevant to stopping the supply of liquid to the milk storage vessel/the milk tank in order to prevent pressurized liquid from entering the milk tank. It is also noted that the "control unit" in the present application does not have to merely control the milk storage system alone, but may also be coupled to other control devices, such as those of the at least one milking device. In this case, the "control unit" is in principle considered to mean the total of all controlling devices which are operatively connected thereto.

The main milk pipe runs in principle from an outflow opening of the temporary milk storage vessel to an inflow opening of the milk tank, and comprises all of the intermediate pipework, in principle also including a pump and the like. The pressurized liquid supply, viewed in the direction of flow, is situated upstream of the first discharge, and comprises, for example, a water pipe or a storage vessel for pressurized liquid and optionally a pressure means, such as a pump or simply gravity. A controllable valve or the like will of course be provided in order to adjust the pressurized liquid supply. It should be noted that such a valve may comprise a non-return valve which prevents pressurized liquid from flowing back towards the temporary milk storage vessel, in other words counter to the intended milk discharge direction. The first selection device may also comprise a valve, such as a non-return valve, or a stopcock or the like, and will preferably be arranged near an end of the main milk pipe which is located at the milk tank. The first selection device may further comprise two separate partial devices which are located at some distance from one another. Nevertheless, they may also be combined in, for example, one housing. Selectively bringing either the first discharge or the second discharge into liquid connection with the main milk pipe implies that the other of the two discharges is not in liquid connection with the main milk pipe. This is of course to prevent undesired mixing of the liquids.

It is further emphatically noted here that the functions mentioned are intended to at least transfer a "body of milk" which substantially fills the main milk pipe into the milk tank by means of liquid. It is specifically not intended that any milk residues remaining behind are flushed away with liquid, as is customary when cleaning the main milk pipe. During this latter action, there is after all no connection to the main milk tank, in order to prevent cleaning liquid from entering the tank. The present invention is specifically characterized by the presence of an open connection to the milk tank while cleaning liquid, or at least a liquid other than milk, is pumped into the main milk pipe. A further effect of the invention is that it is possible to actually transfer a larger part of the milk into the milk tank, since fewer droplets remain attached to the wall. In that case, a considerable total amount of milk would not reach the milk tank, in particular in the case of long main milk pipes, and this milk is supplied to the tank according to the present invention.

The term "breaking" a liquid connection is also intended to mean keeping such a liquid connection in the broken state, if it had already been broken.

The present invention offers advantages even if only one milking device is connected to the temporary milk storage vessel. In this way, it is possible to limit the number of pump movements for the milk. This advantage will apply to an even greater degree if a plurality of milking devices are connected to the temporary milk storage vessel.

The first selection device may comprise a Y connection so that the pressurized liquid is already supplied to the pipe system in the intended milk discharge direction. In this case, the first selection device may comprise, for example, a double non-return valve or, advantageously, one single non-return valve between the milk pipe and the temporary milk storage vessel, and at least one shut-off device between the pressurized liquid supply and the main milk pipe.

The second selection device may comprise, for example, a three-way valve or a plurality of separate valves and/or shut-off devices.

The first selection device is advantageously arranged near an end of the main milk pipe which is located close to the temporary milk storage vessel. In this way, it is of course possible to use the largest part of the main milk pipe to transfer milk.

Particular embodiments are described in the dependent claims, and in the following description. In particular, the control unit is further configured to bring the main milk pipe and the second discharge into liquid connection, in particular substantially simultaneously with the step of breaking the liquid connection between the main milk pipe and the first discharge. In these embodiments, the connection between the main milk pipe and the milk tank is then broken, so that it is no longer possible for any liquid to flow into the milk tank. Any liquid located in the main milk pipe, or liquid which subsequently enters the main milk pipe, can then flow away via the second discharge. The term "substantially simultaneously" is intended to mean that the two actions mentioned occur within a predetermined period of time from one another, in particular within 5 seconds or less. These embodiments are particularly aimed at preventing pressurized liquid from entering the milk tank.

In embodiments, the second discharge comprises a discharge or a plurality of separate discharges to a drain and/or waste liquid receptacle, in each case provided with a shut-off device which is controllable by the control unit. In these embodiments, pressurized liquid, often water or another cleaning liquid, will be able to be discharged towards the drain. Additionally and/or alternatively, the pressurized liquid may be supplied to a waste liquid receptacle, where the liquid can be collected for reuse or the like.

In embodiments, a or the pressurized liquid supply is provided on the main milk pipe, and a second selection device is provided for selectively bringing either the temporary milk storage vessel or the pressurized liquid supply into liquid connection with the main milk pipe. In these embodiments, there is either only one pressurized liquid supply, or there are a plurality. In this case, the pressurized liquid supply, or one of the pressurized liquid supplies, is not provided directly on the temporary milk storage vessel but on the main milk pipe, in particular near an end of the main milk pipe which is connected to the temporary milk storage vessel. This makes it possible to continue collecting milk in the temporary milk storage vessel, while further emptying the main milk pipe by pumping. This provides the possibility of pumping the milk in the entire milking system to the milk tank so that it can be cooled there, particularly if the milk is approaching the permitted non-cooled residence time. Since the main milk pipe may be relatively long, particularly on large farms, such as even several hundred meters, emptying the system by pumping without the ability to collect milk could lead to undesirable delays. The present embodiments limit this drawback.

Alternatively or in addition, there is a pressurized liquid supply on the milk pipe, in particular via the at least one milking device, i.e. upstream of the temporary milk storage vessel, when viewed in the direction of flow. This offers the possibility of using cleaning water, for example, such as the flushing water which is used to begin a cleaning operation and is often tap water, to empty the main milk pipe by pumping. In this case, the temporary milk storage vessel is first emptied by pumping. Subsequently, the flushing water is directed towards the temporary milk storage vessel by means of the at least one milking device and the milk pipe. There, this pressurized liquid is still pressureless. Subsequently, a pump (system) at the temporary milk storage vessel can be used to pump the pressurized liquid under pressure into the main milk pipe in order to push the milk towards the milk tank. The flushing water can thus be used in an optimum way to transfer milk. Therefore, the milk is not only subject to less load, but it is also possible to save energy since no separate pump actions are needed for milk and flushing water in the main milk pipe.

In embodiments, the pressurized liquid supply comprises a connection to a water supply network or to a liquid container having a connecting pipe to either the temporary milk storage vessel or the main milk pipe. In these embodiments, the pressure which is in principle always present on the water supply network is used to provide pressurized liquid. Moreover, such a separate pressurized liquid supply may also be used to transfer milk when no cleaning operation is taking place in the milking device(s). If desired, an additive supply device may be provided in order to also gain an additional cleaning effect, for example. The liquid container may contain, for example, liquid and may be arranged above a connection to the main milk pipe or the temporary milk storage vessel. In this way, it is possible to use gravity to exert pressure on the liquid to be supplied. Nevertheless, it is also possible to provide a pump, for example in order to better control the pressurized liquid.

In embodiments, the milking system comprises a pump system which is controllable by the control unit and serves to pump milk through the main milk pipe, which pump system is provided near the temporary milk storage vessel. In these embodiments, it is possible to actively pump milk through the main milk pipe, although the milk, and therefore other liquid such as the introduced pressurized liquid, may also be transferred by means of gravity, a leakage air supply and the fall of the main milk pipe. The pump system is advantageously provided near the temporary storage vessel, that is at an end of the main milk pipe which is situated at the temporary milk storage vessel. In this way, it is possible to pump the milk, or optionally another liquid, through the main milk pipe in the most reliable way, and the temporary milk storage vessel, in turn, can continue to collect milk while the main milk pipe is being emptied.

It is furthermore possible to supply the pressurized liquid via the at least one milking device, such as via the milking cups or the milk pipe system, for example. This may be effected, for example, with the aid of a milking-device cleaning device provided on the at least one milking device. These cleaning devices are known per se. As the liquid is thus supplied in the temporary milk storage vessel, it is in principle still pressureless there. The pump system can then provide the supplied pressurized liquid to the main milk pipe under pressure. In this case, it will therefore still be possible to supply pressurized liquid to the main milk pipe while said pipe has an open connection to the milk tank, so that pushing pressurized liquid into the main milk pipe causes milk to pump into the milk tank.

In embodiments, the main milk pipe between the temporary milk storage vessel and the first selection device has a volume Vh, and the control unit and the pressurized liquid supply are configured to allow at least a volume Vh of pressurized liquid to flow during the step of allowing an amount of pressurized liquid to flow from the pressurized liquid supply into the main milk pipe. This embodiment guarantees that the entire main milk pipe can be filled with pressurized liquid in a single operation, which makes it possible to ensure an optimum transfer of milk through the main milk pipe. If, in this case, the pressurized liquid supply comprises, for example, a connection to a water supply network, it is sufficient to provide a flow rate meter, which measures the amount of tap water supplied. Alternatively or in addition, it may be sufficient to provide a liquid container having a volume which is at least equal to the volume Vh. Otherwise, it is not necessary to fill the main milk pipe with pressurized liquid in a single operation.

In embodiments, the milking system comprises a meter which is operatively connected to the control unit and is configured to determine a parameter value relating to the amount of pressurized liquid which has flowed into the main milk pipe, in particular a flow rate meter for said amount, and wherein the control unit is configured to perform at least one action depending on the determined parameter value. In particular, the action comprises breaking the liquid connection between the main milk pipe and the first discharge. More particularly, the control unit is configured to perform the at least one action when the parameter value meets a shut-off criterion. In these embodiments, the parameter value to be measured is a direct or indirect indication of the amount of pressurized liquid which has flowed into the main milk pipe. On the basis thereof, it is possible to keep a kind of record of the location of each liquid, since the liquids are non-compressible and will barely mix. It is therefore possible for the control unit to perform an action, if desired, on the basis of the measured parameter value. This may advantageously be an action which relates to directing liquid which is located in the main milk pipe towards the milk tank, if the liquid is milk, or to the second discharge if it is another liquid. Said shut-off criterion then relates to the "record", which relates in particular to the amounts of liquid supplied (milk or pressurized liquid).

In embodiments, the pressurized liquid supply is provided with a pump which is controllable by the control unit, and wherein the flow rate meter comprises a clock for determining the time period during which the pump supplies pressurized liquid. In this embodiment, the flow rate meter is of a simple design and merely comprises a clock, based on the assumption that the supply speed is approximately constant. In that case it is sufficient to multiply the time which has passed by the (constant) supply speed in order to determine the amount. Many types of pump are able to provide a sufficient guarantee of such a constant supply speed.

In embodiments, a sensor which is operatively connected to the control unit is provided in or on the main milk pipe and is configured to monitor a liquid property of liquid flowing past the sensor and to emit an associated sensor signal, wherein the control unit is configured to process the sensor signal and to at least break the liquid connection between the main milk pipe and the first discharge depending on the processed sensor signal. In these embodiments, the sensor is provided in order to monitor the liquid which is located at the sensor in a more direct way. In particular, the sensor can serve to adjust the flow of liquid to the milk tank or the second discharge, respectively. The sensor will in particular be configured to identify milk, by virtue of the fact that a monitored liquid property, in other words a measured or detected liquid property or liquid parameter value, meets a criterion. This will be explained in more detail below. If the detected liquid property meets the criterion and it is therefore concluded that milk is located at the sensor, this liquid (thus milk) can be allowed to reach the milk tank by opening the first discharge and keeping it open. By contrast, the first discharge is closed, and if desired the second discharge is opened, if the measured liquid property does not meet the criterion for milk.

In embodiments, the sensor is chosen from among a conductivity meter, a thermometer, an optical meter and an HF capacitance spectrum profiling meter. In these embodiments, the liquid property chosen is conductivity, temperature, an optical property, in particular transmission, reflection, diffusion, color or color spectrum, or an HF capacitance spectrum profile, respectively. In the latter case, a spectral capacitance profile of the liquid is determined in the high-frequency range. The conductivity of milk meets properties which are well known per se and lies within well-defined limits which in principle significantly differ from that of water (which is much lower) and of cleaning liquid to which a cleaning preparation has been added (which is usually much higher). The temperature of milk, if obtained not too long ago, is usually between 20° C. and 35° C. This temperature is higher than the temperature of most tap water, and usually lower than heated cleaning liquid. The spectral capacitance profile of milk in the high-frequency range may be determined with the aid of calibration measurements and provides information, in particular, about dielectric properties.

In embodiments, the control unit is configured to process the sensor signal depending on the determined parameter value. In these embodiments, the processing of the sensor signal is made dependent on the determined parameter value, wherein, for example, nothing is done to the signal if the parameter value, particularly a parameter relating to the amount, indicates (with a high degree of probability) that it is still not possible for a liquid interface to be located in the vicinity of the sensor. This restricts the possibility of performing actions which are based on an erroneous measurement, such as discharging drinking milk to the drain.

In embodiments, the milking system comprises a device which is operatively connected to the control unit and serves to determine whether at least part of the main milk pipe contains milk, wherein the control unit is configured to control the pump system depending on an outcome of the determination. In particular, the pump system has a first position with a low pump speed and a second position with a higher pump speed, wherein the control unit is configured to set the pump system to the first position for pumping if the determination indicates that at least part of the main milk pipe contains milk, and to set the pump system to the second position for pumping if the determination indicates that no part of the main milk pipe contains milk. In these embodiments, the pump for pumping liquid into the main milk pipe is configured to pump milk at a relatively low pump speed and, when there is no longer any milk located in the main milk pipe, to pump the pressurized liquid at a relatively high speed. The latter provides advantages owing to an improved cleaning effect, while the former leads to improved milk quality, as described above. Said device may, for example, comprise the same or an identical flow rate mater or liquid property meter as described above. In this case, too, it is possible that a "record" will suffice in order to check whether milk is still located in the main milk pipe. The control unit may be configured accordingly.

The invention also relates to a milk storage system as claimed in claim 14, in particular a milk storage system for use in a milking system according to the invention, and comprising a temporary milk storage vessel configured to temporarily store milk from the at least one milking assembly, at least one milk pipe connected to the temporary milk storage vessel for supplying milk from the one or more milking devices to the temporary milk storage vessel, a milk tank for storing the milk from the temporary milk storage vessel, a control unit for controlling the milk storage system, a main milk pipe from the temporary milk storage vessel to the milk tank, wherein the milk storage system is configured to transfer the milk from the temporary milk storage vessel to the milk tank via the main milk pipe, and further comprises a pressurized liquid supply which is controllable by the control unit and is provided and configured to supply a pressurized liquid, other than milk, to at least one of the temporary milk storage vessel and the main milk pipe, a first discharge to the milk tank and a second discharge to a destination other than the milk tank, provided on the main milk pipe, a selection device which is controllable by the control unit and is on the main milk pipe, which first selection device is configured to selectively bring either the first discharge or the second discharge into liquid connection with the main milk pipe, wherein the control unit is configured to perform a milk transferring action for transferring milk in the main milk pipe into the milk tank with the aid of the pressurized liquid, wherein the liquid transferring action comprises the steps of bringing the pressurized liquid supply and the first discharge into liquid connection with the main milk pipe, and breaking a liquid connection of the main milk pipe to the second discharge, allowing an amount of pressurized liquid to flow from the pressurized liquid supply into the main milk pipe, and breaking the liquid connection between the main milk pipe and the first discharge.

This milk storage system, which may subsequently be integrated in a milking system having one or more milking devices, can offer the same advantages as those described above for the milking system. It requires no further explanation that all particular features mentioned in relation to the milking system apply in full to the milk storage system, and may then offer the same particular advantages. However, these features and advantages will not be repeated here for the sake of brevity.

The invention also relates to the use as claimed in claim 15, in particular in a milking system, and in particular in a milking system according to the invention, the use of water for transferring milk obtained by the milking device through a pipe into a milk tank. This use has the advantage, as already described above, that the milk is transferred particularly carefully. This ensures better retention of the quality. It should be noted once again that the transfer of residues of milk which remain after emptying a milk pipe by blowing does not fall under this use, but exclusively the transfer of an amount of milk in the main milk pipe into the milk tank. Preferably, the milk fills a complete cross section of the milk pipe, at least locally. This also guarantees that the pressurized liquid and the milk mix as little as possible in the main milk pipe.

The invention also relates to a method as claimed in claim 16, in particular a method for pumping milk from a first storage vessel to a second storage vessel connected thereto via a milk pipe, in a milking system having at least one milking device, and in particular a milking system according to the invention, comprising at least partially filling the milk pipe with milk from the first storage vessel, supplying a pressurized liquid, other than milk, to the main milk pipe under pressure and allowing it to move in the direction of the second storage vessel, for the purpose of pushing at least part of the milk located in the milk pipe into the second storage vessel, and closing off the main milk pipe.

This method also provides the advantages already mentioned above, and is also combinable with all particular features and advantages described in relation to the milking system. Not all of these features and advantages will be repeated below.

In particular, the milking system comprises a plurality of milking devices, each having a milk jar, wherein the first storage vessel is a temporary storage vessel which is configured to receive milk from a plurality of the respective milk jars. In this embodiment, too, it is emphasized that the temporary milk storage vessel is not a milk jar, but a storage vessel for milk from a plurality of milking operations. Such a temporary milk storage vessel, or buffer vessel, may serve to reduce the number of pump movements of milk in the main milk pipe and to enable the use of a dedicated milk pump. Moreover, it will be possible to separate milk and entrained air in the temporary milk storage vessel, which also results in an improvement in the quality of the milk.

In embodiments, the method comprises the step of monitoring a parameter value of the liquid in the main milk pipe, for the purpose of monitoring the approach of a transition from milk to another liquid, and stopping the pumping into the second storage vessel when the parameter value meets a predetermined transition criterion. These embodiments guarantee that milk can enter the milk tank, while other liquid, in particular pressurized liquid, is prevented from entering the milk tank. It should be noted that the pumping itself can continue, as long as it is ensured that the wrong liquid cannot enter the milk tank, for example by closing the first discharge. Furthermore, the predetermined transition criterion will particularly include the measured parameter value lying outside the range which applies to (drinking) milk. The parameter value is of course measured upstream of the second storage vessel, when viewed in the direction of flow. For the parameters, reference is made to the corresponding passages in the description of particular embodiments of the milking system according to the invention.

In embodiments, the step of stopping the pumping into the second storage vessel comprises breaking a connection of the main milk pipe to the second storage vessel, and in particular connecting the main milk pipe to a discharge other than the second storage vessel, more particularly to a drain or waste milk receptacle. These embodiments ensure that liquids which are not milk are discharged to a destination other than the second storage vessel. This may be, for example, a drain or a container for waste liquid, such as waste milk (antibiotic milk, mastitis milk, etc.) or waste liquid. In the latter case, this may be advantageous, for example, for reusing liquid. It should be noted that "stopping the pumping" could also comprise disconnecting the pump and draining the main milk pipe.

In embodiments, the step of monitoring comprises monitoring a physical property of the liquid using a sensor suitable for this purpose, in particular measuring an electrical conductivity, an HF capacitance spectrum profile, an optical value, such as color, transmission or reflection, or a density. For an explanation of these properties and sensors, reference is made to the corresponding passage in the description of the milking system according to the invention.

In embodiments, the step of monitoring comprises monitoring the time period during which the liquid is pumped into the main milk line, in particular also measuring, during said time period, a parameter value which is unambiguously related to a flow rate of the liquid in the milk pipe.

In embodiments, the method comprises increasing a speed of pumping from a first pumping speed to a second pumping speed when the parameter value meets a predetermined transition criterion, more particularly wherein the first pumping speed results in a speed of the liquid in the milk pipe of at most 1.5 m/s, preferably at most 1 m/s, and wherein the second supply speed results in a speed of the liquid in the milk pipe of at least 1.5 m/s. In these embodiments, a higher pump speed is selected if the predetermined transition criterion is met, in particular when it is determined that there is no longer any milk in the main milk pipe. This can be realized, for example, by monitoring a liquid property, wherein the property or parameter value lies outside the range for milk, or by monitoring in the "record" where milk is still located in the main milk pipe. Of course, it is also possible to pump the other liquid at the same speed as the milk.

The invention will now be explained in greater detail with reference to the drawing, which shows some non-limiting illustrative embodiments, and in which:

FIG. 1 shows a highly diagrammatical view of a milking system 1 according to the invention, and FIGS. 2a to 2d show four steps or situations in the method according to the invention, in highly diagrammatical cross section.

FIG. 1 shows a highly diagrammatical view of a milking system 1 according to the invention. Here, the milking system 1 also comprises a carrousel 3 with milking cups 4 in addition to four milking devices 2. Each milking device 2 has milking cups 4 and a robot 5 (not necessarily present) in order to attach the milking cups to the teats of a dairy animal. In addition, a milk jar 6 is provided in each case for collecting the milk from a milking operation and a milk pump 7 for pumping the milk through the milk pipe 8 to a milk storage system 9, comprising a temporary milk storage vessel 10 which is connected to a milk tank 12 via a main milk pipe 11.

Reference numeral 13 denotes a control unit and reference numeral 15 denotes a pressurized liquid supply, which is connected to the main milk pipe 11 via a second selection device 16, and a boiler 17, a water pipe supply 18, a pump 19 and a flow rate meter 20.

In addition, reference numeral 21 denotes a first discharge and reference numeral 22 denotes a second discharge to a waste receptacle 23, as well as a selection device 24.

Reference numeral 25 denotes a pump system comprising a first pump 26 and a second pump 27. Reference numeral 30 denotes a sensor.

In addition to a carrousel 3 comprising a plurality of milking stations with milking cups 4, the milking system 1 illustrated here also comprises four robot milking devices 2. It will be clear that the milking system may also only comprise a carrousel, or even a plurality of carrousels, or even only any number of robot milking devices, such as two, eight or sixteen, etc.

In addition, not all details which are not relevant to the invention have been shown, such as milking stations at the robot milking devices, etc. Also, the cleaning device 40 is only shown with one robot milking device 2. It will be clear that these will be provided with or for each of the robot milking devices 2, although not necessarily separately in each case.

During use of the system 1 according to the invention, milk which is milked by the milking devices 2, 3 will be collected in the temporary milk storage vessel 10 via the milk pipe system 8. This milk can then be pumped by the pump system 25 to the milk tank 12 through the main milk pipe 11. However, the pump system 25 cannot pump the milk any further than its own outlet. Therefore, in principle, the main milk pipe 11 will remain full of milk. The milk can then flow towards the milk tank 12, in principle, under the influence of gravity, but this is undesirable and, for example, too slow, particularly in the case of very long milk pipes 11 of, for example, several hundred meters, and additionally requires an air or gas supply in the main milk pipe so as not to create an inhibitory underpressure.

According to the invention, the milk in the main milk pipe 11 is pumped by supplying a pressurized liquid via the pressurized liquid supply 15. The supply may also be effected via the milking cups, via the milk pipe system 8 or otherwise upstream of the temporary milk storage vessel. However, the former option has the advantage that it takes place downstream of the pump system 25, as viewed in the direction of flow, so that the temporary milk storage vessel 10 can begin collecting milk again. In this way, the milking devices 2, 3 do not have to wait, in principle, for the milk to be pumped. It should be noted that this pumping may be necessary because the milk, for example, has already been in the temporary milk storage vessel 10 for two hours and thus has to be pumped to a cooled storage, such as the milk tank 12. By supplying pressurized liquid to the main milk pipe 11, for example, via the pressurized liquid supply 15, the milk contained therein is pushed in the direction of the milk tank 12. The selection device 24 will be set by the control unit 13 in such a way that the main milk pipe 11 is in liquid connection with the first discharge to the milk tank 12, and not with the second discharge 22 to the drain 23. The interface between the pressurized liquid and the milk will move, however, through the main milk pipe 11 in the direction of the selection device 24. When this interface passes the sensor 30, the sensor 30 will detect a change in a measured value, such as for example a change in an electrical conductivity value, an optical transmission value, a color, etc. For this purpose, the sensor 30 comprises, for example, a conductivity meter, an optical meter (such as a photoelectric cell) or an HF capacitance spectrum profiling meter.

When the sensor 30 measures a liquid transition, in this case from milk to pressurized liquid, the control unit 13 connected to the sensor 30 can reverse the selection device 24 in such a way that the liquid connection between the main milk pipe 11 and the first discharge 21 to the milk tank 12 is closed and the liquid connection between the main milk pipe 11 and the second discharge 22 to the drain is opened. The pressurized liquid is thus discharged not to the milk tank but to the discharge or the drain 23.

In order to prevent the control unit 13 from incorrectly interpreting an inaccurate measurement of the sensor 30, it is possible to make use of a time window within which the measurements of the sensor 30 are accepted. To this end, the amount of pressurized liquid which is pumped in the main milk pipe 11 is monitored by or for the control unit 13, for example with the aid of a flow rate meter 20. After all, a change in the measured value as measured by the sensor 30 will not have any meaning until it is probable that the interface between milk and pressurized liquid has at least approached the sensor 30. The volume of the main milk pipe 11 between, for example, the second selection device 16 and the sensor 30 may be determined in a simple way, including by taking length×cross-sectional area of the main milk pipe 11, or by simply determining this volume once. When, for example, the flow rate meter 20 has determined that a certain minimum fraction of this volume of pressurized liquid has been pumped into the main milk pipe 11, the control unit can switch over to processing the sensor values from the sensor 30. Such a predetermined part of the volume may be, for example, 90% or any other fraction which is effective in practice.

FIGS. 2a to 2d show four steps or situations in the method according to the invention, in highly diagrammatical cross section.

FIG. 2a shows a starting situation, with the temporary milk storage vessel 10 being substantially filled with milk 14. The main milk pipe 11 is also filled with milk, and is in liquid connection with the first discharge 21 to the milk tank 12. To this end, the selection device 24 is shown in more detail, and comprises a milk valve 35 towards the first discharge 21 and a pressurized liquid valve 36 towards the second discharge 22. Furthermore, the second selection device 16 is shown in more detail and comprises a pressurized liquid valve 16-1 and a milk valve 16-2.

In the situation shown, the pressurized liquid valves 16-1 and 36 are closed, and the milk valves 16-2 and 35 are open, so that milk can flow from the temporary milk storage vessel 10 to the milk tank 12 through the main milk pipe 11, with the aid of the pump system 25.

Figure 2B:
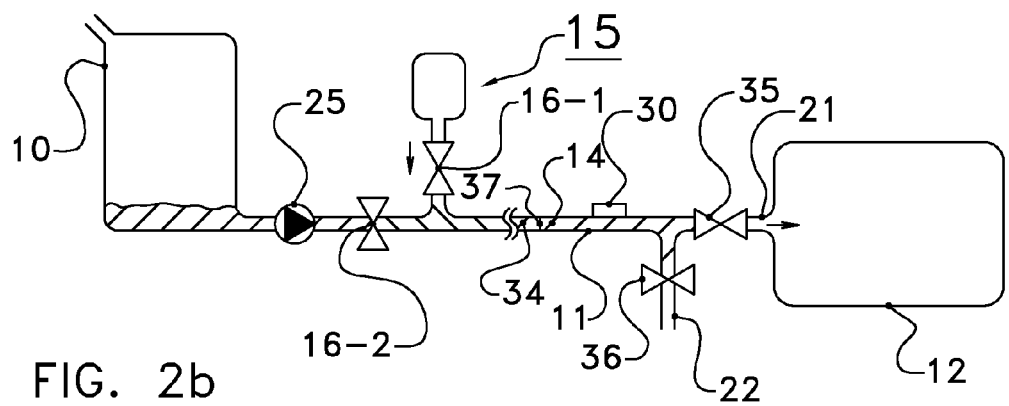

FIG. 2b shows the situation in which the temporary milk storage vessel 10 has been virtually emptied by pumping and in which the milk valve 16-2 is closed and the pressurized liquid valve 16-1 is open, and some pressurized liquid has already flowed into the main milk pipe 11, for example under the influence of a pressurized liquid pump system (not illustrated, see pump 19 in FIG. 1). The interface 37 between milk 14 and pressurized liquid 34 is illustrated. The milk valve 35 is still open, so that the milk 14 in the main milk pipe 11 can flow towards the milk tank 12, under the influence of the pressurized liquid 34. However, the sensor 30 will detect the interface 37 after a short time, by means of a change in a parameter value measured by the sensor 30, such as the electrical conductivity. The electrical conductivity of milk is higher than that of water, and lower than that of water containing a cleaning preparation, so that the transition 37 can be reliably detected by the sensor 30.

Figure 2C:
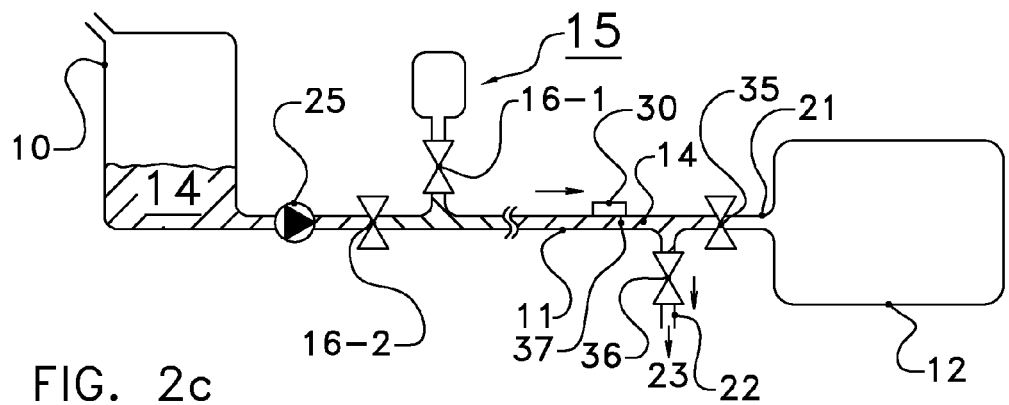

In FIG. 2c, the interface has just passed the sensor 30 so that the control unit 13 (not illustrated here) has taken the required actions. As a result, the milk valve 35 is now closed, to prevent pressurized liquid 34 from entering the milk tank 12. Furthermore, the pressurized liquid valve 36 is open so that pressurized liquid 34 can flow away towards the drain 23 or the like via the second discharge 22. For example, the pressurized liquid supply 15 may continue to supply pressurized liquid for some time, for example to clean the main milk pipe 11. It is also possible to accelerate the draining with the aid of compressed air. The milk valve 16-2 will remain closed during this time, while new milk 14 has been collected in the temporary milk storage vessel 10 in the meantime.

Figure 2D:
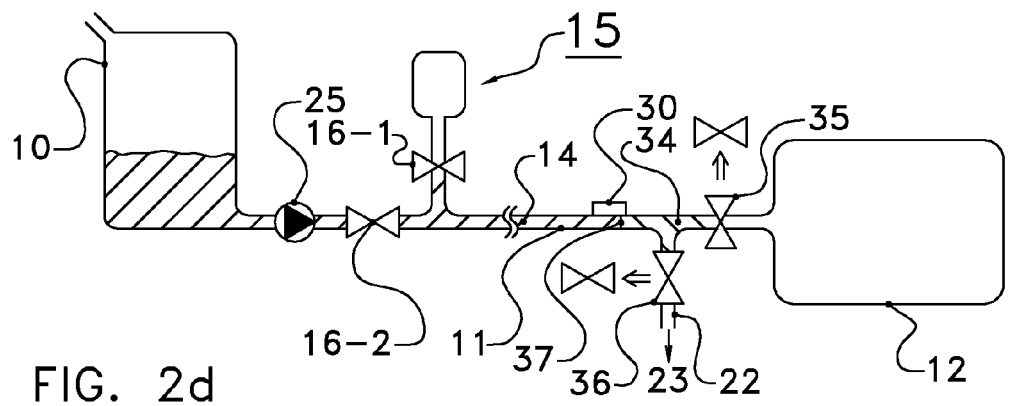

FIG. 2d shows a possible subsequent step, in particular in the situation where pressurized liquid 34 is not drained. In that case, the pressurized liquid 34 remaining in the main milk pipe 11 could in turn also be pushed away by milk 14. In the case illustrated in FIG. 2d, so much milk 14 has already been pumped into the main milk pipe 11 by the pump system 25 that the interface 37 has already just passed the sensor 30. It should be noted that the pressurized liquid valve 16-1 is closed and the milk valve 16-2 is open. In addition, the milk valve 35 is closed and the pressurized liquid valve 36 is open, so that the pressurized liquid 34 located in front of the interface 37 is pushed towards the drain via the second discharge. However, the sensor 30 has now detected the interface 37, so that the control unit 13 (not illustrated) will perform the following actions. The milk valve 35 is opened, as graphically represented in FIG. 2d, and the pressurized liquid valve 36 is closed, as graphically represented in FIG. 2d. The milk 14 present in the main milk pipe 11 can thus be pumped into the milk tank 12 by the pump system 25. It is of course recommended to wait before performing the actions mentioned until it is sufficiently certain that the pressurized liquid 34 has flowed away via the second discharge 22 and no pressurized liquid is entering the milk tank 12.

As an alternative, however, it is possible to close the pressurized liquid valve 16-1 and to also keep the milk valves 16-2 and 35 closed after the milk has been pumped away in accordance with FIGS. 2b and 2c, with the pressurized liquid valve 36 remaining open. It is thus possible for all (pressurized) liquid present in the main milk pipe 11 to flow away via the second discharge 22, in order to thus drain the main milk pipe 11. In that case, it is not necessary to detect an interface 37 when milk is once again pumped through the main milk pipe 11. However, it should be noted that the milk 14 which is now pushed forwards could push air into the milk tank 12, although this does not have to signify a problem if suitable ventilation is in place. It is noted here that it is advantageous to pump continuously, in order to counteract the mixing of milk and pressurized liquid.

The illustrated embodiments are only intended and given as non-limiting examples. The scope of protection is determined by means of the attached claims.

The invention claimed is:

1. A milking system, comprising:
   at least one milking device with milking cups and a milk jar; and
   a milk storage system,
   wherein the milk storage system comprises:
      a temporary milk storage vessel, not being said milk jar, configured to temporarily store milk for human consumption from a plurality of milking operations of the at least one milking device;
      at least one milk pipe connected to the temporary milk storage vessel for supplying milk from the one or more milking devices to the temporary milk storage vessel;
      a milk tank for storing the milk for human consumption from the temporary milk storage vessel;
      a control unit for controlling the milk storage system; and
      a main milk pipe from the temporary milk storage vessel to the milk tank,
   wherein the milk storage system is configured to transfer the milk from the temporary milk storage vessel to the milk tank via the main milk pipe, and further comprises:
      a pressurized liquid supply which is controllable by the control unit and is provided and configured to supply a pressurized liquid, other than milk, to the milk storage system;
      a first discharge to the milk tank and a second discharge to a destination other than the milk tank, provided on the main milk pipe; and
      a selection device which is controllable by the control unit and is on the main milk pipe, wherein the selection device is configured to selectively bring either the first discharge or the second discharge into liquid connection with the main milk pipe,
   wherein the control unit is configured to perform a milk transferring action for transferring milk in the main milk pipe into the milk tank with the aid of the pressurized liquid,
   wherein the milk transferring action comprises the steps of:
      bringing the pressurized liquid supply and the first discharge into liquid connection with the main milk pipe;
      breaking a liquid connection of the main milk pipe with the second discharge;
      allowing an amount of pressurized liquid to flow under pressure from the pressurized liquid supply into the main milk pipe; and
      breaking the liquid connection between the main milk pipe and the first discharge.

2. The milking system as claimed in claim 1, wherein the control unit is further configured to bring the main milk pipe and the second discharge into liquid connection, substantially simultaneously with the step of breaking the liquid connection between the main milk pipe and the first discharge.

3. The milking system as claimed in claim 1, wherein the second discharge comprises a discharge or a plurality of separate discharges to a drain and/or waste liquid receptacle, in each case provided with a shut-off device which is controllable by the control unit.

4. The milking system as claimed in claim 1, wherein the pressurized liquid supply is provided on the main milk pipe, the selection device is a first selection device, and a second selection device is provided for selectively bringing either the temporary milk storage vessel or the pressurized liquid supply into liquid connection with the main milk pipe.

5. The milking system as claimed in claim 1, wherein the pressurized liquid supply comprises a connection to a water supply network or to a liquid container having a connecting pipe to either the temporary milk storage vessel or the main milk pipe.

6. The milking system as claimed in claim 1, comprising a pump system which is controllable by the control unit and serves to pump milk through the main milk pipe, which pump system is provided near the temporary milk storage vessel.

7. The milking system as claimed in claim 6, comprising a device which is operatively connected to the control unit and serves to determine whether at least part of the main milk pipe contains milk, and
   wherein the control unit is configured to control the pump system depending on an outcome of the determination, wherein the pump system has a first position with a low pump speed and a second position with a higher pump speed, and wherein the control unit is configured to set the pump system to the first position for pumping if the determination indicates that at least part of the main milk pipe is filled with milk, and to set the pump system to the second position for pumping if the determination indicates that no part of the main milk pipe is filled with milk.

8. The milking system as claimed in claim 1, wherein the main milk pipe has a volume Vh between the temporary milk storage vessel and the selection device, and wherein the control unit and the pressurized liquid supply are configured to allow at least a volume Vh of pressurized liquid to flow during the step of allowing an amount of pressurized liquid to flow from the pressurized liquid supply into the main milk pipe.

9. The milking system as claimed in claim 1, comprising a meter which is operatively connected to the control unit and is configured to determine a parameter value relating to the amount of pressurized liquid which has flowed into the main milk pipe, and wherein the control unit is configured to perform at least one action depending on the determined parameter value, wherein the action comprises breaking the liquid connection between the main milk pipe and the first discharge.

10. The milking system as claimed in claim 9, wherein the pressurized liquid supply is provided with a pump which is controllable by the control unit, and wherein the flow rate meter comprises a clock for determining the time period during which the pump supplies pressurized liquid.

11. The milking system as claimed in claim 9, wherein the control unit is configured to process the sensor signal depending on the determined parameter value.

12. The milking system as claimed in claim 1, wherein a sensor which is operatively connected to the control unit is provided in or on the main milk pipe, said sensor being configured to monitor a liquid property of liquid flowing past the sensor and to emit an associated sensor signal, wherein the control unit is configured to process the sensor signal and to at least break the liquid connection between the main milk pipe and the first discharge depending on the processed sensor signal.

13. The milking system as claimed in claim 12, wherein the sensor is chosen from among a conductivity meter, an optical meter, a thermometer and an HF capacitance spectrum profiling meter.

14. A method in the milking system as claimed in claim 1, said method comprising the step of using water for transferring milk obtained by the milking device through a pipe into a milk tank.

15. A method for pumping milk from a first storage vessel to a second storage vessel connected thereto via a milk pipe, in the milking system as claimed in claim 1, said method comprising the step of:
   at least partially filling the milk pipe with milk from the first storage vessel;
   supplying a pressurized liquid, other than milk, to the main milk pipe under pressure and allowing the pressurized liquid to move in the direction of the second storage vessel, for the purpose of pushing at least part of the milk located in the milk pipe into the second storage vessel; and
   closing off the main milk pipe.

16. The method as claimed in claim 15, wherein the milking system comprises a plurality of milking devices, each having a milk jar, and wherein the first storage vessel is a temporary storage vessel which is configured to receive milk from a plurality of the respective milk jars.

17. The method as claimed in claim 15, comprising the step of monitoring a parameter value of the liquid in the main milk pipe, for the purpose of monitoring the approach of a transition from milk to another liquid; and
   stopping the pumping into the second storage vessel when the parameter value meets a predetermined transition criterion.

18. The method as claimed in claim 17, wherein the step of stopping the pumping into the second storage vessel comprises breaking a connection of the main milk pipe to the second storage vessel, and connecting the main milk pipe to a discharge other than the second storage vessel, to a drain or waste milk receptacle.

19. The method as claimed in claim 17, wherein the step of monitoring comprises monitoring a physical property of the liquid using a sensor suitable for this purpose, wherein the monitoring a physical property comprises measuring an electrical conductivity, an HF capacitance spectrum profile, an optical value, transmission or reflection, or a density.

20. The method as claimed in claim 17, wherein the step of monitoring comprises monitoring the time period during which the liquid is pumped into the main milk pipe, during said time period, and determining a parameter value which is unambiguously related to a flow rate of the liquid in the milk pipe.

21. The method as claimed in claim 17, comprising increasing a speed of pumping from a first pumping speed to a second pumping speed when the parameter value meets a predetermined transition criterion, wherein the first pumping speed results in a speed of the liquid in the milk pipe of at most 1.5 m/s, and wherein the second supply speed results in a speed of the liquid in the milk pipe of at least 1.5 m/s.

22. A milk storage system comprising:
   a temporary milk storage vessel configured to temporarily store milk for human consumption from a plurality of milking operations of at least one milking device, the at least one milking device including milking cups and a milk jar;
   at least one milk pipe connected to the temporary milk storage vessel for supplying milk from the at least one milking device to the temporary milk storage vessel;
   a milk tank for storing the milk for human consumption from the temporary milk storage vessel;
   a control unit for controlling the milk storage system; and
   a main milk pipe from the temporary milk storage vessel to the milk tank,
   wherein the temporary milk storage vessel is not said milk jar,
   wherein the milk storage system is configured to transfer the milk from the temporary milk storage vessel to the milk tank via the main milk pipe, and further comprises:
   a pressurized liquid supply which is controllable by the control unit and is provided and configured to supply a pressurized liquid, other than milk, to the milk storage system;
   a first discharge to the milk tank and a second discharge to a destination other than the milk tank, provided on the main milk pipe; and
   a selection device which is controllable by the control unit and is on the main milk pipe, wherein the selection device is configured to selectively bring either the first discharge or the second discharge into liquid connection with the main milk pipe,
   wherein the control unit is configured to perform a milk transferring action for transferring milk in the main milk pipe into the milk tank with the aid of the pressurized liquid,
   wherein the milk transferring action comprises the steps of:
   bringing the pressurized liquid supply and the first discharge into liquid connection with the main milk pipe, and breaking a liquid connection of the main milk pipe with the second discharge;
   allowing an amount of pressurized liquid to flow under pressure from the pressurized liquid supply into the main milk pipe; and
   breaking the liquid connection between the main milk pipe and the first discharge.

* * * * *